United States Patent [19]

Bost

[11] Patent Number: 4,806,077

[45] Date of Patent: Feb. 21, 1989

[54] COMPOSITE MATERIAL BLADE WITH TWIN LONGERON AND TWIN BOX STRUCTURE HAVING LAMINATED HONEYCOMB SANDWICH COVERINGS AND A METHOD OF MANUFACTURING SAME

[75] Inventor: Michel Bost, Joinville-le-Pont, France

[73] Assignee: Societe Nationale Industrielle et Aerospatiale, Paris, France

[21] Appl. No.: 78,497

[22] Filed: Jul. 28, 1987

[30] Foreign Application Priority Data

Jul. 28, 1986 [FR] France ................................ 86 10882

[51] Int. Cl.[4] .............................................. B64C 27/46
[52] U.S. Cl. ..................... 416/226; 416/144; 416/229 R
[58] Field of Search ............... 416/226, 229 A, 229 R, 416/230, 144

[56] References Cited

U.S. PATENT DOCUMENTS

| | | | |
|---|---|---|---|
| 3,429,023 | 2/1969 | Blythe et al. | 416/226 |
| 3,713,753 | 1/1973 | Brunsch | 416/226 |
| 3,883,267 | 5/1975 | Baudier et al. | 416/230 |
| 4,316,700 | 2/1982 | Schramm | 416/226 |
| 4,407,635 | 10/1983 | Grimes | 416/230 |
| 4,696,623 | 9/1987 | Bost | 416/226 |

FOREIGN PATENT DOCUMENTS

| | | |
|---|---|---|
| 2558709 | 7/1977 | Fed. Rep. of Germany ...... 416/230 |
| 3014347 | 10/1981 | Fed. Rep. of Germany ...... 416/230 |
| 1154586 | 4/1958 | France . |
| 2381662 | 9/1978 | France . |

Primary Examiner—Robert E. Garrett
Assistant Examiner—John T. Kwon
Attorney, Agent, or Firm—Armstrong, Nikaido Marmelstein & Kubovcik

[57] ABSTRACT

A composite material blade is provided having a twin longeron and twin box structure with laminated honeycomb sandwich coverings, including a front leading edge longeron of a C shaped section, a central longeron with two sole pieces at the ends of a transverse web with honeycomb filling sandwiched between lateral sheets, and laminated coverings made from honeycomb panels sandwiched between external and internal sheets formed by stacking layers of fiber fabric, so as to define two boxes filled with very light foam cores, the sole pieces being integrated in the coverings which are joined at the level of the trailing edge by a rider in the form of a foam wedge.

13 Claims, 3 Drawing Sheets

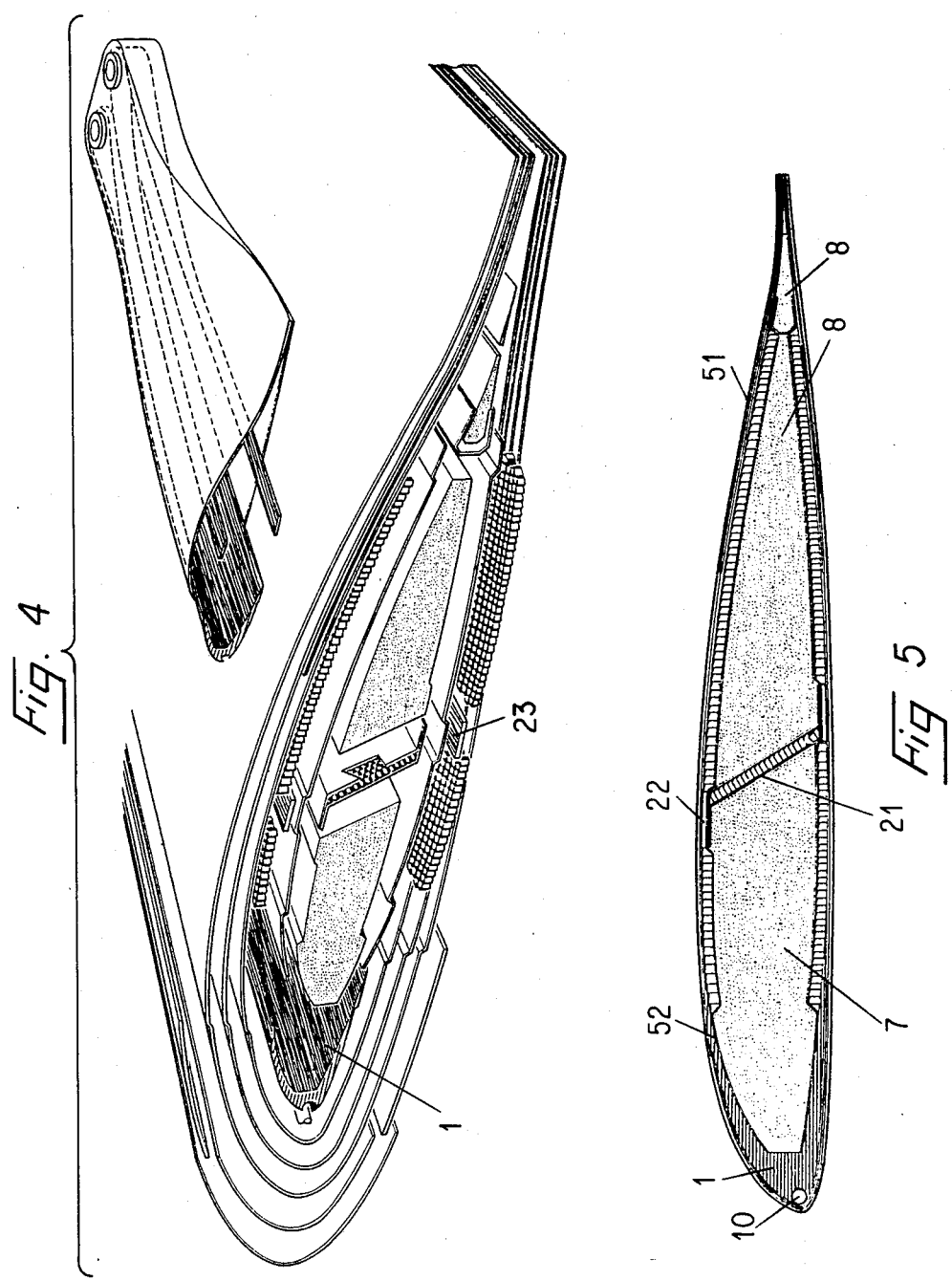

COMPOSITE MATERIAL BLADE WITH TWIN LONGERON AND TWIN BOX STRUCTURE HAVING LAMINATED HONEYCOMB SANDWICH COVERINGS AND A METHOD OF MANUFACTURING SAME

BACKGROUND OF THE INVENTION

1. Field of the Invention

The present invention relates to a composite material blade for an aircraft rotor with rotating wings and the invention relates more precisely to a blade for equipping helicopter rotors in particular for military use and whose twin longeron structure extending over the whole span of the blade and whose twin torsion and flexion box structure extending over the whole chord of the blade, as well as laminated honeycomb sandwich coverings, provide a fail-safe characteristic.

Numerous constructions of composite material blades are already known for helicopter rotors, whose structure has been particularly designed for withstanding torsional and flexional forces and for being redundant so as to preserve the integrity of operation after structural damage.

In general, the structure of these known blades includes a main leading edge longeron made from laminated threads of high mechanical strength fibers agglomerated by means of a synthetic polymerized resin, possibly doubled by one or more other auxiliary longerons, of the same construction, and either a single box in the vicinity of the leading edge, integrating the main longeron and one or more of the auxiliary longerons if provided, or a multiple box extending along the chord or in the thickness of the blade and integrating all the longerons. The or each box of these blades contains a working filling core formed of a block of a honeycomb of cellular material of average density, such as a foam, or a honeycomb block and is enveloped at least partially by the skin of the blade generally formed from a stack of at least two layers of a fabric of fibers agglomerated by a synthetic polymerized resin. The fibers are possibly oriented in different directions, preferably crossed, and slanted with respect to the longitudinal axis of the corresponding blade. In the case of a structure with a single box at the leading edge, the rear part of the blade includes one or more filling blocks, adjacent to the forward box and situated therebehind and possibly adjacent each other depending on the span of the blade, and this or these filling blocks, enveloped directly by the skin of the blade, is or are formed either from an alveolar or cellular material, for example with closed cells such as synthetic foam, or as a honeycomb. In all cases, the main advantage sought is a great rigidity under torsion, more particularly for eliminating the vibrations resulting from coupling between the flexional and torsional deformations of the blade.

2. Description of the prior Art

By way of example, the French patent No. 2 381 662 of the applicant relates to a composite material blade with forward torsion box formed of a leading longeron extending over the whole span of the blade and formed as a single piece, from hanks of laminated threads of glass fibers, with a solid cross section substantially in the form of a slightly flattened D, having a solid core made from a light alveolar material and juxtaposed with the whole rear face of the longeron and a layer surrounding the longeron and the core made from at least one layer of a fabric including parallel glass fibers disposed slantwise with respect to the longitudinal axis of the blade, this layer having considerable thickness, appreciably greater than that of the coating or skin of the blade, which envelops the forward box as well as a rear filling element, also made from a light alveolar material and juxtaposed against the cross and central rib formed by the rear face of the box, that is to say by the part of the peripheral layer which covers the rear face of the core of the box, this latter extending along the chord of the cross section of the blade over approximately the front half of the profile of the blade, whose external shape it matches.

Other similar constructions are known, in which the rear filling element is a honeycomb block.

By way of second example, the French patent No. 84 19 432 of the applicant describes a multilongeron and twin box structure whose resistance framework, close to the leading edge of the blade, is formed as two boxes superimposed in the direction of the thickness of the blade, each of which extends over the whole span of the blade and is formed of a front longeron and a rear longeron each formed of a bundle of laminated threads of fibers agglomerated by a resin, a filling core made from a light material disposed between these two longerons and an envelope enclosing the two longerons and the core, and including at least one layer of a fabric made from parallel fibers disposed slantwise with respect to the longitudinal axis of the blade, the two boxes being firmly secured together by simultaneous polymerization of the superimposed and jointing parts of their envelopes, thus forming a median sole, whereas a light alveolar filling element is disposed at the rear of the two boxes and an outer coating envelops the two boxes and the rear filling element.

The disadvantages of these known constructions in which the cores of the box or boxes and or the rear filling elements are honeycomb blocks, concern their complexity of manufacture and their cost, for their manufacture requires great machining accuracy and precautions and tight tolerances so that the honeycomb blocks have upper and lower surfaces which are at all points "parallel" to the profile of the desired blade, while ensuring suitable clamping of the honeycomb blocks by their covering, for if they are clamped too much the hexagonal mesh or cells of the honeycomb network is crushed whereas insufficient clamping results in separation between the coating and the filling and/or surface defects. The perfect machining required for the honeycomb blocks is all the more complicated since modern blades have profiles which are evolutive depending on the span, even tapering. Another drawback of these known constructions is that the honeycomb filling cores or elements do not provide a sufficient internal counterpressure during molding of the blade for their stiffness is practically zero in the direction of the chord of the blade. It is therefore impossible to manufacture, in a single molding operation, a blade having an economical longeron of the type formed of hanks of laminated threads of high mechanical strength fibers impregnated with polymerizable resin, and which is shaped during polymerization of the resin, during molding, through the presence of a filling and/or a core exerting a counter pressure with respect to the molding pressure caused by closure of the mold parts. Similarly, it is impossible to manufacture in a single molding operation a twin box blade having therefore a central rib, or even worse, a multibox blade with several ribs for this or these ribs must also be shaped with the assistance of a sufficient counterpressure provided by a filling core and/or element.

These drawbacks are not to be found in known constructions in which the cores of the box or boxes and/or the rear filling element or elements are made from a light alveolar or cellular material, such as a foam, for such a material plays the role of internal shaping tool or mandrel, providing an internal counterpressure during molding, which gives the possibility of manufacturing blades whose internal structure may be complex, in a single molding operation. The interest of this advantage is essential for designing an economic blade. In addition, because of its flexibility, such an alveolar material, similar to a foam, requires much less accurate machining than the honeycombs, therefore less costly and a sufficient overthickness of the prefabricated foam blocks allows any surface defects to be avoided.

On the other hand, these known constructions with box core and/or rear filling elements are made from an alveolar or cellular material such as a foam have drawbacks which are proper thereto, particularly in the case of shocks or impacts on the blades. These shocks or impacts cause deformation of the coating and of the filling of the blade, and these deformations are the cause of stripping phenomena about the periphery of the impacts, which results in considerable separations which only stop, in the case of violent shocks, after reaching a resistant element such as the trailing edge of the blade or an edge or a wing of a longeron, and this whatever the method of connecting the coating to the filling or foam core (adhesive film or self adhesive resin interface or not), for the rupture always occurs in the foam. In fact, it is the very nature of these alveolar materials which does not allow them to withstand and transmit stripping loads, contrary to honeycombs which support this type of stress well, because of the good connection obtained at the level of each mesh or cell of the hexagonal network with the coatings, by means of adhesive films.

Furthermore, the known constructions of blades with thin laminated coatings, formed by a simple stack of a few layers of fiber fabric and in which the box cores and/or rear filling elements are made from alveolar materials or from honeycomb blocks have as common disadvantages that these blades are necessarily dependent, particularly with respect to shocks and impacts, on the stabilization provided by the cores and/or the filling elements, and that in the case of damage following a shock or an impact of a projectile, the repair requires the localized replacement of the material of the core of the filling over the whole thickness of the profile of the blade. In fact, whether this material is alveolar or honeycombed, in the case of perforation of a simple coating or thin skin of the blade, at the present time it is necessary to remove the whole of the damaged zone and, so as to be certain to find a healthy filling, the damaged filling must be replaced as far as the other face of the coating so as to avoid having to join the added piece with the filling in place, in the middle of the profile of the blade. In addition, in the case of a shock or impact during flight, the coating or thin skin becomes flexible and floating after unsticking from the filling, in particularly made from foam, and may rapidly, through the combined effect of aerodynamic stresses, vibrations, pressures and depressions, split and strip, thus presenting a real risk.

As state of the art the French patent No. 1 154 586 may also be mentioned which describes a blade whose covering on the rear part is formed of two intercalated panels with internal and external metal walls, between which is disposed a light filling made from honeycomb or other light filling material. But this blade has a front part and a rear part which are practically hollow, the front part including essentially a metal laminated leading edge longeron, of C cross section, formed of a large number of layers of thin metal sheets alternating with layers of an adhesive material, and a vertical longeron plate closing the rear part of the longeron, whereas the rear part of the blade includes stiffening elements in the form of the above mentioned intercalated upper and lower panels. The connection between the longeron and the longeron plate and between this latter and the walls of the intercalated panels are provided by laminated brackets and the intercalated panels, profiled with special radii of curvature and tapering at the front as at the rear, possibly include dense layer inserts, laminated and in stepped formation, between the walls of the panels which are such that the internal wall of one of the panels extends towards the trailing edge until it meets the external walls of the other panel, or such that the external walls of the panels extend as far as the trailing edge whereas their internal walls meet up forward of the trailing edge so as to form a joint, with, in any case, at least one profiled relatively rigid wedge shaped piece, providing, at the rear, the junction of the two covering panels. The drawbacks of this construction are related to the metal nature of the resistant framework and of the skin of the blade, as well as to the complexity of its structure, and so the complexity and to the cost of its manufacture, because more particularly of the need to machine the filling elements of the panels when they are made from honeycombs. In addition, the wedge shaped piece of the trailing edge indispensable to the strength of the blade and required in this construction for increasing the drag rigidity, and which is also a working member taking up a part of the centrifugal force, is a factor of vulnerability of the blade, for a single direct impact on this piece may cause its breakage.

SUMMARY OF THE INVENTION

The aim of the invention is to provide a composite material blade which overcomes the drawbacks of blades of this type known in the prior art, with a single and thin covering and with box cores and/or filling elements made from alveolar or cellular or honeycomb materials, in so far as concerns the vulnerability to shocks and impacts and the ease of repair in case of damage, the ability of the structure to withstand loads during use and to be readily manufactured at an economic cost using simple means, and preferably in a single molding operation.

For this, the composite material blade of the invention, of the type including:

a forward torsion and flexion box extending substantially over the forward half of the blade and defined by a forward longeron disposed along the leading edge of the blade over the whole of its span and formed from at least one bundle of laminated threads of high mechanical strength fibers agglomerated by means of a synthetic polymerized resin, a central and transverse rib disposed substantially along the thickness of the blade so as to substantially connect its extrados with its intrados, in the mean part of the chord of the blade, and which extends over the whole span thereof, front extrados and intrados covering parts which connect the front longeron to the transverse rib so as to close the forward box, and a core filling the forward box, made from an alveolar material, and a rear filling element, also made from an alveolar material, adjacent the transverse rib and extending therefrom to the vicinity of the trailing edge of the blade and over the whole span thereof, with a wedge shape profiled to the shape of the rear half of the blade, is characterized in that it further comprises:

a central longeron extending also over the whole span of the blade and including an extrados sole piece or sill and an intrados sole piece or sill each formed from at least one bundle of laminated threads of high mechanical strength fibers agglomerated by means of a synthetic polymerized resin, integrated respectively in the extrados covering and firmly secured respectively to the upper end and to the lower end of the central rib, one on one side and one on the other of the mean plane of this rib, so that the central longeron has a section in which the form of a Z whose end flanges are formed by the laminated thread sole pieces and whose web is formed by the central and transverse rib, a rear torsion and flexion box extending substantially over the rear half of the blade and defined between:

the central longeron, and rear extrados and intrados covering portions which are disposed in the rearward extension of the covering portions closing the forward box and which are fixed along the trailing edge of the blade so as to close the rear box about a filling core formed by the rear filling element, said front and rear portions of the extrados and intrados coverings each having a laminated shell structure with a web formed of a honeycomb panel of constant thickness sandwiched between two working sheets to which the honeycomb panel is bonded and each formed of a stack of at least two layers of fabric made from high mechanical strength fibers agglomerated by means of a synthetic polymerized resin, one of the two sheets being an internal sheet adjacent the corresponding core and the other an external sheet forming the skin of the blade, and the two filling cores forming internal non working shaping mandrels, formed from a very light alveolar material.

The blade thus formed has a twin box and twin longeron fail-safe structure whose main resistant members are redundant: on the one hand the two torsion and flexion boxes are juxtaposed at the front and at the rear of the central rib and extend over the whole of the chord of the blade and, on the other hand, the longeron assembly is continuously doubled over the whole span of the blade, which provides a complementary fail-safe character because of the distribution of the longerons in different zones of the section of the blade and, more particularly, because of the presence of a main solid longeron at the leading edge and two sole pieces for the central longeron placed at the rear of the forward box and intimately connected to the structure of the blade, on the one hand to the extrados and intrados coverings and, on the other hand, to the ends of the central and transverse rib in the median part of the chord.

The blade thus formed further includes safety and stabilized coverings which offer excellent shock and impact strength because of the use of a honeycomb web sandwiched between the working sheets formed of balanced layers of fiber fabric: in fact, for a given covering mass, a honeycomb sandwich construction has a higher rigidity because of the distance separating the two lateral sheets of the covering, which provides great security in the case of a shock during flight. In this case, the sandwich covering will maintain its structural role, even after separation between the internal covering layer and the underlying alveolar material of the corresponding core, because the breakage will preferably occur in this alveolar material, at this level, which is a reason for choosing a material such as a foam for filling the boxes. For the same shock, the separation will be less serious in a blade with sandwich covering than in a blade with simple covering and foam filling, and the repair will be thus correspondingly facilitated. The destruction of an external covering sheet for example will not cause total loss of the torsional stiffness of this covering for the internal covering sheet will remain intact, which will also facilitate the repair of a perforation in an external covering sheet and will be very often limited to placing a patch at the level of the thickness of the sandwich. For these reasons, the construction of honeycomb sandwich blade coverings provides stabilized blade skins which are sufficient in themselves in the case of impact and reduce the role of the alveolar material of the cores, providing a shock absorbing function under each working covering (external covering sheet, honeycomb panel, internal covering sheet), of a simple internal mandrel during molding of the blade. In fact, the use of cores made from an alveolar material such as a foam allows a suitable internal counterpressure to be developed during molding, which ensures good shaping of the laminated thread longerons. Because the cores for filling the forward and rear boxes only play essentially the role of a shaping mandrel for the manufacture and only very slightly participate in the general strength of a blade, they can be made from prefabricated blocks of a very light foam, which allows an assembly to be obtained formed of laminated coatings and of the alveolar material filling core which has a lower weight per unit of length (expressed in kilograms per linear meter of blade) than for a blade with thin and single coating in which the alveolar filling material is a working material of higher density.

To sum up, the blade of the invention combines the advantages and properties of each of the materials such as honeycombs and foams used separately in known constructions, while preserving an economic character for the blade of the invention, all the more so since the honeycomb panels of the coatings require no machining, for they are used directly in a strip of constant thickness after simply cutting to the suitable width. The combined use in accordance with the invention, of honeycombs and foam type alveolar material provides the benefit of the ease of construction of blades with filling and/or foam cores while keeping the qualities, in use, of blades with cores and/or honeycomb filling whose manufacture is very complex.

Advantageously, in order to improve both the connection of the coverings to the forward longeron and the participation of the forward core in the shaping of the forward longeron, this latter has as substantially C shaped section, the two free ends of which are in abutment against the forward edge of the honeycomb panels of the front portions of the extrados and intrados coverings, whereas the internal sheets of said front portions of these coverings are fixed by their front end portion against the internal faces of the ends of the C shaped longeron, between said internal faces and the front filling core, which fills the recess of the C shaped longeron, and the external sheets of said front portions of these coverings are fixed by their front end portion against the external face of the front longeron which they cover at least partially.

Preferably, so as to provide centering of the cross section of the blade substantially with the front quarter of the chord, without adversely affecting the overall cohesion of the blade, the front C shaped longeron has, in its portion directly adjacent the leading edge, a longitudinal recess housing a counterweight made from a high density material, which is covered by the front portions of the external sheets of the front parts of the extrados and intrados coverings of the blade, which join up at the level of the leading edge.

Similarly, it is preferable for the leading edge of the blade to be protected by a cover and, in this case, the front longeron has on the front of its external face a step in which said cover protecting the leading edge is housed, the external sheets of the front parts of the extrados and intrados coverings then being nipped by their front end portion in the step of the front longeron, between this latter and the cover.

If the extrados and intrados coverings are not continuous, the blade may be in the form of a main front stabilized box, integrating the front longeron and the central longeron, and on the rear of which is provided a light trailing edge formed only of the rear parts of the intrados and extrados covering as well as by the rear core. But, advantageously, for economic manufacture in a single molding step, the external layer of each of the extrados and intrados coverings extends continuously from the leading edge of the blade to its trailing edge while covering the external face of the corresponding sole piece of the central longeron, as well as the external face of a front panel and of a rear honeycomb panel of the corresponding covering, which extend respectively from the front longeron to the corresponding sole piece, and from this latter as far as the vicinity of the trailing edge of the blade, and the internal sheet of each of said coverings extends also continuously from the front longeron to the trailing edge of the blade while covering the internal face of the corresponding sole piece of the central longeron, as well as the internal face of said front and rear honeycomb panels of the corresponding covering.

Furthermore, so that the central rib forming the web of the central longeron may benefit from the same advantages as those provided by the coverings of the blade, it is advantageous for this web of the central longeron to have a laminated shell structure formed of another honeycomb panel of constant thickness sandwiched between two lateral sheets to which the honeycomb filling is bonded and which are each formed from at least one layer of a fabric of fibers agglomerated by a synthetic polymerized resin.

Fixing of the ends of this web to the sole pieces of the central longeron is simplified if, in addition, the two lateral layers of said web extend beyond the upper and lower ends of its honeycomb filling so as to form two flanges extending one on one side and the other on the other side of the mean plane of said honeycomb web and secured against said internal sheets of the extrados and intrados coverings forming said sole pieces of the central longeron.

In a preferred embodiment, the web of the central longeron is slanted slightly from the front to the rear and from the extrados to the intrados and the extrados and intrados sole pieces extend respectively forwardly and rearwardly of said web.

The fibers of the different layers of the sheet of the coverings may be of the same kind, for example solely of glass fibers, but all combinations of materials - glass, aramide fibers such as those commercialized under the trademark Kevlar, carbon fibers, etc - and orientations of the fibers are possible. However, in the blade of the invention, it is advantageous to optimize the performances of the covering sheets by the choice of fabric layers of fibers of different kinds, the layers considered as being the most vital, for example those having the most resistant fibers and, in general simultaneously, the most fragile to shocks being disposed inwardly of the corresponding covering, which also protects them from other damage, such as scores, because of the presence of at least one external surface layer made for example from glass fibers. For helicopters for military use, the use of carbon fibers will be avoided which are unfavorable when a low radar signature is desired.

If it is necessary to increase the drag stiffness of the blade, it is advantageous to provide in addition two strips reinforcing the trailing edge, which extend substantially over the rear third of the blade and are made from materials reinforced with high mechanical strength fibers in the form of sheets or in the form of a fabric and which are each disposed between rear facing portions of the external sheet of one of the coverings, on one side and on the other side of the external face of the rear honeycomb panel and of the internal sheet of the corresponding covering, so that the external sheets and the reinforcement strips of the extrados and intrados covering form, in their rear end portion, a trailing edge tongue whereas the internal sheets of said coverings are fixed in their rear end portion against the inside of the reinforcement strips. These reinforcement strips, which may be formed of any strip material reinforced with glass, carbon, aramide or other fibers, allow the trailing edge added to most known blades to be omitted, the fragility of which is well known. However, since it is necessary to provide the connection between the internal sheets of the extrados and intrados coverings, in their rear end portion close to the trailing edge, the connection between these layers is provided by a trailing edge rider formed of a foam wedge hemmed in by a C shaped section rib fixed by its external face against the inside of the internal covering sheets.

In a preferred embodiment of the blade of the invention, the front and central longerons are formed of unidirectional laminated glass threads oriented in the direction of the span of the blade, each lateral sheet of the web of the central longeron is formed of a stack of three glass fiber fabric layers whose fibers are oriented at $\pm 45°$ with respect to the longitudinal axis of the blade, and each internal or external sheet of each extrados or intrados covering includes an external, with respect to the corresponding cover, glass fiber fabric layer whose fibers are oriented along the longitudinal axis of the blade perpendicularly to this axis, each internal sheet and each external sheet further including respectively two and three internal, with respect to the corresponding covering, aramide or carbon fiber fabric layers whose fibers are oriented at $\pm 45°$ with respect to the longitudinal axis of the blades. The fiber layers at $\pm 45°$ provide essentially the torsional stiffness of the sole pieces and of the web of the central longeron, whereas the layers of fibers along this longitudinal axis and perpendicular thereto also provide the flapping and drag stiffness of these elements. Similarly, so as to obtain reinforcement strips which are not vulnerable, each of them is advantageously formed of two or three superimposed layers of disymmetric glass or carbon fiber fabric, in which 90% of the fibers are oriented along the longitudinal axis of the blade and 10% of the fibers perpendicularly to this axis. Finally, a compatible trailing edge rider is advantageously formed by the superimposition of two glass fiber fabric layers whose fibers are oriented along the axis of the blade and perpendicularly to this axis.

The invention also provides a method for manufacturing a blade with continuous extrados and intrados coverings, such as defined above, and which essentially comprises a single molding operation thus guaranteeing the integrity of the finished product, only the front and rear cores and the web of the central longeron being prefabricated components, the first by machining blocks of a very light foam and the last by stacking its component elements and shaping the end flanges, then by polymerization as a single piece.

Such a manufacturing method in a single molding operation is known from the above mentioned French patent No. 2 381 662 and consists in assembling the different component elements of the blade and curing the resins which impregnate them during the single molding operation, in a single mold having two rigid half molds, the inner shape of each of which is adapted to the shape of the corresponding half of the profile of the blade, taking into account its variations in shape, thickness, chord and twist depending on its span, the upper half mold being locked on the lower half mold after successive positioning of the different corresponding component elements, and the mold thus loaded being then placed in an oven for a conventional polymerization cycle, for example lasting two hours at a temperature of about 120° C.

The method of the invention is distinguished from the known method by the particular nature and succession of the elements positioned in the two half molds and it is characterized in that the order of positioning the elements is the same in the two half molds, only the counterweight, the front and rear cores, the web of the central longeron and the trailing edge rider being placed in the lower half mold and the method consists in successively positioning in each of the half molds, the external sheet of the corresponding covering, disposing first of all in the bottom of the half mold the layer or layers of fabric made from fibers impregnated with polymerizable resin whose fibers are less fragile to shocks, when the external sheet includes fabrics made from fibers of different kinds, hanks of laminated threads impregnated with polymerizable resin, forming one of the two complementary halves of the front longeron and, in the lower half mold, the counterweight in front of said hanks in this half mold, hanks of laminated threads impregnated with polymerizable resin and forming the corresponding sole of the central longeron, a reinforcement strip of the trailing edge, on the rear third of the external sheet, the honeycomb front panel and rear panel of the corresponding covering, disposed on the external sheet, the first between the front half longeron and the corresponding sole piece of the central longeron and the second behind this latter, towards the trailing edge, after applying an adhesive film on each side of the two panels, and the internal sheet of the corresponding covering, disposing first of all in the corresponding half mold the layer or layers of fabrics made from fibers impregnated with polymerizable resin whose fibers are more fragile to shocks, when the internal sheet includes fabrics made from fibers of different kinds, then, positioning in the lower half mold, the front core,
the web of the central longeron,
the rear core, and
the trailing edge rider, before turning over the loaded upper half mold on the loaded lower half mold and closing the mold so as to carry out polymerization.

BRIEF DESCRIPTION OF THE DRAWINGS

The invention will be better understood and other advantages and characteristics of the invention will be clear from reading the following description of a particular embodiment given by way of non limitative example with reference to the accompanying drawings in which:

FIG. 4 shows a cross-cut partially exploded view of the showing the component parts; and FIG. 5 shows another cross-section with the component parts labeled.

DESCRIPTION OF THE PREFERRED EMBODIMENT

Figure 1:
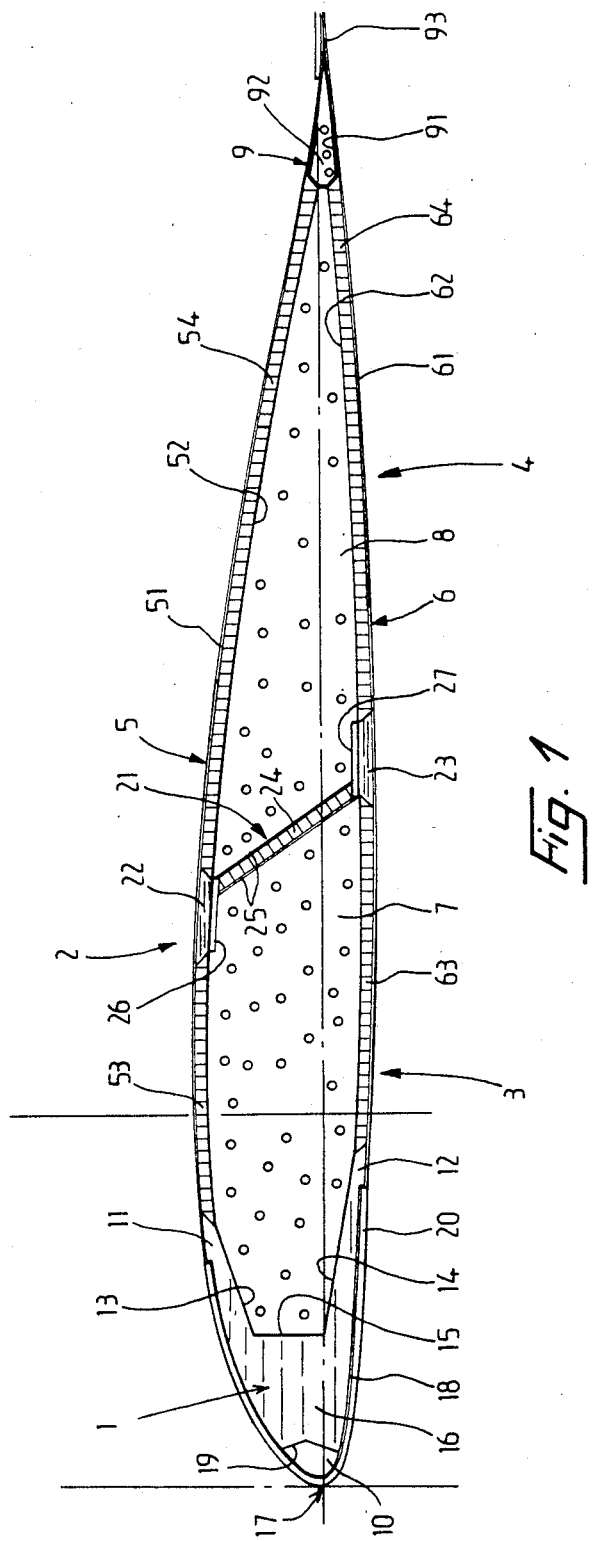
FIG. 1 is a cross sectional view of the blade, in its usual part, and in the direction of its chord.

In FIG. 1 and FIG. 5 is shown, in cross section through its chord, a composite material blade section having, by way of example, a modern disymmetric profile with a chord of 600 mm and including essentially a structure with twin longeron extending over the whole span of the blade formed of a front longeron 1 and the central longeron 2 and twin boxes extending not only over the whole span but also along the whole chord of the blade and formed of a front box 3 and a rear box 4 which are defined, in the direction of the chord, respectively between the two longerons 1 and 2 and at the rear of the central longeron 2, as well as laminated extrados 5 and intrados 6 coverings which cooperate with longerons 1 and 2 so as to close the boxes 3 and 4 respectively about the front 7 and rear 8 filling cores, the rear box 4 being closed at its rear end by a trailing edge rider 9 which provides the junction, at this level, between the two coverings 5 and 6 over the whole span of the blade. Finally, a counterweight 10 for balancing the blade is mounted at the front of the front longeron 1.

The front longeron 1 is formed of hanks of laminated unidirectional and longitudinal glass threads (extending substantially parallel to the longitudinal axis of the blade along the span thereof), which are agglomerated by a polymerized synthetic resin (FIG. 4), for example an epoxy resin. Longeron 1 has a C shaped section. The upper flange 11 and the lower flange 12 (longer than the upper flange 11) of the C shaped longeron 1, which are tapered at their rear end, are substantially divergent with respect to each other and are defined by internal flat faces 13 and 14 connected together by an internal vertical face 15 of the central part 16 of the C, and by the external face of the longeron 1 which is curved to the profile of the front part of the blade, on each side of the leading edge 17. Over the major part of its external surface and from one flange 11 to the other 12, the longeron 1 has a stepped recess 18, of constant depth, and the front tip of longeron 1 is cut out to form a V shaped housing 19, in which is housed and retained the counterweight 10, made for example of a heavy metal with a density greater than 17, providing centering of the section of the blade substantially in the forward quarter of the chord (center of gravity at 25% of the chord from the front of the leading edge 17). The front face of counterweight 10 extends the profile of longeron 1 at the bottom of step 18 so that a cover 20 protecting the leading edge, made for example from stainless steel of about 1 mm in thickness, is bonded in the step 18 and on top of the counterweight 10.

The central longeron 2 has a transverse web 21 which is prefabricated and polymerized as an isolated part, and which passes substantially through the thickness of the blade in the central part of the chord, by being slightly slanted from the front towards the rear and from the extrados towards the intrados, as well as two sole pieces 22 and 23, one 22 of which is integrated with the extrados covering 5 and connected by this latter, as will be explained below, to the upper end of web 21, whereas the other sole piece 23 is integrated with the intrados covering 6 and is connected similarly to the lower end of web 21.

Web 21 is a shell shaped element extending over the whole span of the blade and whose filling 24 is formed of a flat laminated honeycomb panel of a constant thickness of 5 mm, of the type commercialized under the trademark NOMEX, having mesh of 3 mm and a weight per unit of volume of 29 kg/m$^3$, and this filling 24 is bonded between two identical lateral sheets 25. Each lateral sheet 25 is formed by the superimposition of three glass fabric layers, agglomerated by means of a polymerized synthetic resin and disposed so that their fibers are oriented at ±45° with respect to the longitudinal axis of the blade. The two lateral sheets 25 extend beyond the upper and lower edges of filling 24 over substantially equal lengths and are applied one against the other over these lengths so as to form an upper flange 26 and a lower flange 27 which are bent respectively forwardly and rearwardly of the mean filling plane 24 so that web 21 has a Z shaped section.

Each of the two sole pieces 22 and 23 is formed, like the front longeron 1, of hanks of laminated unidirectional and longitudinal glass threads agglomerated by means of a polymerized synthetic resin, and each has a trapezoidal shaped section, with the large base turned towards the outside of the profile and with a small base turned towards the inside of the profile and opposite the corresponding flange 26 or 27 of web 21, whose sole piece 22 or 23 is only separated by the thickness of the internal sheet from the corresponding extrados 5 or intrados 6 covering, as explained below.

The laminated extrados covering 5 includes an external sheet 51, an internal sheet 52 and two honeycomb panels of constant thickness, of the same kind as that of filling 24 of web 21, and which are sandwiched between the two external 51 and internal 52 sheets, with each of which each panel is firmly secured by an adhesive film, one of the two panels being a front panel 53, in abutment by its front end against the rear end of the upper flange 11 of the front longeron 1 and by its rear end against the front face of the sole piece 22, the other panel being a rear panel 54, in abutment by its front end against the rear face of the same extrados sole piece 22 and by its rear end against the trailing edge rider 9. The external sheet 51 of covering 5 is formed by stacking an external layer of glass fabric, with fibers oriented along the longitudinal axis of the blade and perpendicular to this axis, and three internal layers of an aramide fiber fabric with fibers oriented at ±45° with respect to the longitudinal axis of the blade, the four layers being agglomerated by means of a synthetic polymerized impregnation resin. This external sheet 51 extends continuously from the leading edge 17 to the trailing edge while being firmly secured between cover 20 and the front longeron 1, then to the front panel 53, the large external base of sole piece 22, the rear panel 54 and the trailing edge rider 9. The internal sheet 52 of covering 5 is formed by stacking an external layer, external with respect to the covering 5, so inwardly of the profile of the blade, which is made from a glass fabric with fibers oriented along the longitudinal axis of the blade and perpendicularly to this axis, and two internal layers (inwardly of covering 5) of an aramide fiber fabric with fibers oriented at ±45° with respect to the longitudinal axis of the blade, these three layers being agglomerated by means of a polymerized synthetic resin. This internal layer 52 is secured by its front end portion against the internal face 13 of the upper flange 11 of the front longeron 1, then against the internal face of the front panel 53, between the small internal base of sole piece 21 and the upper flange 26 of web 21, against the internal face of the rear panel 54 and finally between the upper face of rider 9 and the rear end portion of the external sheet 51.

Similarly, the laminated intrados covering 6 includes an external sheet 61 and an internal sheet 62, of the same construction respectively as external 51 and internal 52 sheets, as well as two honeycomb panels of constant thickness 63 and 64, of the same kind as panels 53, 54 and 24, and which are sandwiched between sheets 61, 62, one of the panels being a front panel 63 in abutment by its front end against the rear end of the lower flange 12 of the front longeron 1 and by its rear end against the front face of the intrados sole piece 23, and the other being a rear panel 64 in abutment by its front end against the rear face of sole piece 23 and by its rear end against the rider 9. The external sheet 61 also extends continuously from the leading edge 17 (where it is jointing with the front end of the external sheet 51 of the extrados covering 5) as far as the trailing edge, while being firmly secured between the cover 21 and the front longeron 1 then against the front panel 63, the large external base of the sole piece 23, the rear panel 63 and the rider 9. The internal sheet 62 is firmly secured by its front end portion against the internal face 14 of the lower flange 12 of the front longeron 1, then against the internal face of the front panel 63, between the small internal base of sole piece 23 and the inner flange 27 of web 21, against the internal face of the rear panel 64 and finally between the lowered face of rider 9 and the rear end portion of the external sheet 61.

The front 7 and rear 8 filling cores of ate respectively front 3 and rear 4 boxes are machined to the shape of the internal volumes defined between the two longerons 1 and 2 and the front parts of coverings 5 and 6, limited to the front panels 53 and 63 for the front core 7, and between the longeron 2 and rider 9 and the rear covering portions 5 and 6, limited to the rear panels 54 and 64, for the rear core 8, and these cores are machined from prefabricated blocks of a rigid polyurethane foam of very low density.

Figure 2:
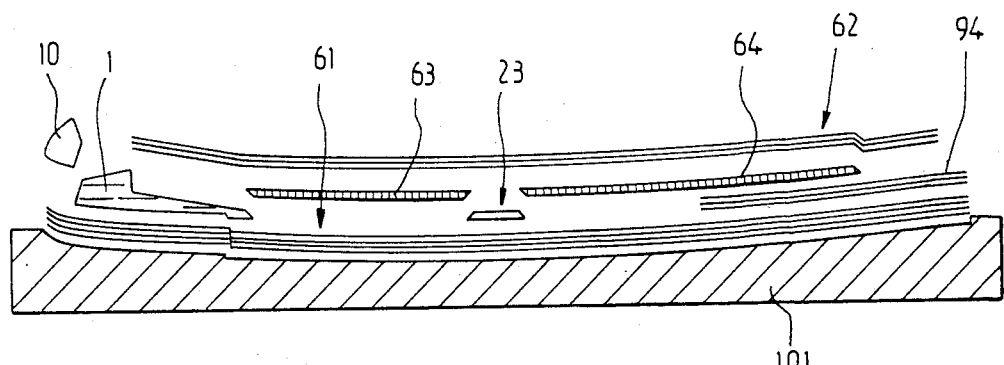
FIG. 2 is a diagrammatical view showing the positioning of the component elements of the blade in the lower half mold.

The trailing edge rider 9 is formed of a C shaped rib 91 formed by stacking two layers of glass fabric whose fibers agglomerated by means of a polymerized synthetic resin are oriented along the longitudinal axis of the blade and perpendicularly to this axis, as well as a wedge 92 made from a rigid polyurethane foam which is gripped round by the C shaped rib 91, closed on itself and whose lower and upper external surfaces are connected respectively to the rear end portions of the internal 62 and external 61 sheets of the intrados covering 6 and to the rear end portions of the internal 52 and external 51 sheets of the extrados covering 5, the two external sheets 51 and 61 being extended beyond the rear end of the rider 9 so as to form a trailing edge tongue 93. In order to increase the drag rigidity of the blade, a strip for reinforcing the trailing edge is advantageously disposed over the rear third of the chord, between each external sheet 51 or 61, towards the outside and towards the inside, the rear end portions of the rear honeycomb panel 54 or 64 and of the internal sheet 52 or 62 which cover the respectively upper or lower face of the rider 9. As shown schematically in FIG. 2, each of the two reinforcement strips 94 for the trailing edge is formed by stacking three layers of disymmetric glass fabric, 90% of the fibers of which are oriented in the longitudinal or span direction and the remaining 10% in the direction of the chord.

The cohesion of the blade is provided by the polymerization of the resins impregnating all the components which are thus firmly secured together. The arrangement of a main longeron at the leading edge and a central longeron 2 at the rear of the main front box 3 gives a complementary fail-safe character which is added to that resulting from the presence of the two boxes 3 and 4 juxtaposed on each side of the laminated web 21 and with the honeycomb sandwich of the central longeron 2, and which extend over the whole chord, because longeron 1 and the central longeron 2 are continuous and are intimately connected to the working structure of the coverings 5 and 6, since longeron 1 is engaged with good continuity, in particular by its flanges 11 and 12, between the external 51 and 62 and internal 52 and 62 sheets of the two coverings 5 and 6, and since the same goes for the sole pieces 22 and 23 of the central longeron 2 which are in addition connected to the flanges 26 and 27 of web 21 of the central longeron 2.

In the external 51, 61 and internal 52, 62 sheets of the coverings, the fiber fabric layers the most fragile to shocks and the most vital, that is to say the aramide fiber fabric layers, are disposed inwardly of coverings 5 and 6 and are protected from external aggressions (shocks, scores,etc) by the external glass fabric layer. In addition, the internal fabric layers whose fibers are slanted at ±45° and the layers of the lateral sheets 25 of web 21 provide the stiffness under torsion of coverings 5 and 6 of web 21, whereas the external fabric layers whose fibers are oriented along the longitudinal axis of the blade provide stiffness against flapping and drag of coverings 5 and 6. These latter, because of their honeycomb sandwich structure, have great rigidity and great safety in the case of shocks or impacts, and they maintain their structural role even after separation between an internal covering sheet 52 or 62 and a foam core 7 or 8. These cores 7 and 8 only participate to a minor extent in the strength of the blade. But they play a role of shapers for the longerons during molding, by acting as internal tools exerting a counterpressure. In addition, these cores 7 and 8, because of their flexibility, may be readily and economically machined with sufficient overthickness so as to avoid any surface defect, for they then exert a pressure against the inside of coverings 5 and 6, and the foam cores 7 and 8 also play the role of shock absorbers in the case of shocks or impacts causing an inward deformation of a covering 5 or 6. Should a single external sheet 51 or 61 of a covering 5 or 6 be perforated, the repair is readily carried out by fixing in the perforated part a standard piece formed of a plug of foam of the same thickness as the honeycomb at present locally destroyed, and a disk of the same construction as the external covering sheet. On the other hand, if the damage to covering 5 or 6 is such that both its external 51 or 61 and internal 52 or 62 sheets are perforated, the corresponding internal core 7 or 8 should first of all be repaired by injecting resin, then filling in the perforation in the internal sheet by means of a disk of the same construction and finally filling in the recess in the honeycomb and the perforation in the external sheet by means of a standard repair piece, s explained above, so as to reform the covering 5 or 6.

Figure 3:
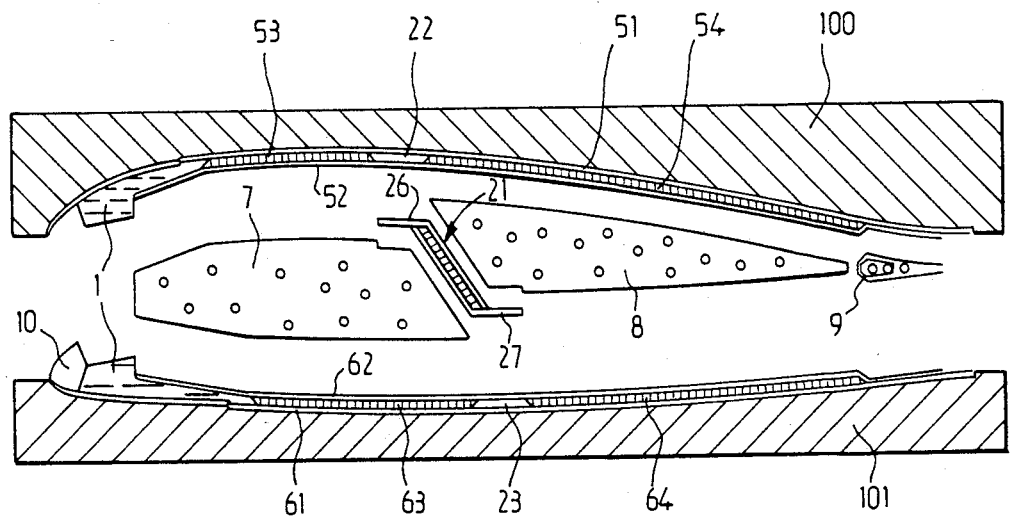
FIG. 3 is a diagrammatical view showing the loaded upper half mold, turned over on top of the loaded lower half mold, before closure of the mold for polymerization.

Because of the presence of cores 7 and 8, forming internal shaping mandrels, it is possible to manufacture the blade in a single molding operation, using a single mold having an upper half mold 100 and a lower half mold 101, which are rigid and complementary, and which have internal cavities whose shapes correspond to the shapes of the respectively upper and lower halves of the blade, taking into consideration the variations of the profile thereof in so far as the shape, the thickness, the chord and the twist along the span are concerned. With the two half molds 100 and 101 turned with their cavity facing upwards, the molding method consists first of all in assembling the different component elements of the blade in the two half molds, following a positioning order which is the same in each half mold for all the component elements except for the two foam cores 7 and 8, the central rib 21, the counterweight 10 and the leading edge protective cover 20 (which are prefabricated elements) and the trailing edge rider 9, which are disposed in the lower half mold 10. As shown schematically in FIG. 2 for the lower half mold 101, the positioning of the elements in each half mold consists successively in disposing first of all at the bottom of the cavity and from the leading edge zone to the trailing edge zone, the four superimposed layers of fabric made from fibers impregnated with polymerizable resin of the external sheet 51 or 61, beginning by the glass fabric layer, then covering it with the three aramide fiber fabric layers. On top of the front part of this stack, hanks of laminated longitudinal glass threads impregnated with a polymerizable resin are then disposed, so as to form one of the two complementary halves of the front longeron 1, and the counterweight 10 is then placed at the front of this half longeron 1 in the lower half mold 101. Then, on the central part of the stack, there are then placed the four layers of the external sheet 51 or 61, and the hanks of laminated unidirectional glass threads preimpregnated with polymerizable resin for forming the corresponding sole piece 22 or 23. Then, over the rear third of the four layers of the external sheet 51 or 61 are laid the three superimposed layers of glass fabric preimpregnated with polymerizable resin for forming the corresponding reinforcement strip 94 of the trailing edge. Then a front honeycomb panel 53 or 63 is disposed between the front half longeron 1 and the corresponding sole piece 22 or 23 and a rear honeycomb panel 54 or 64 behind the solepiece 22 or 23 and substantially over the front half of the corresponding reinforcement strip 94, after coating the two faces of each panel with an adhesive film. Finally, in each half mold 100 and 101, is disposed the stack of three layers of fabric preimpregnated with polymerizable resin of the corresponding internal sheet 52 or 62, beginning by the two internal aramide fiber fabric layers then laying the external glass fabric layer, these three layers extending from the front over the flange of the corrsponding half longeron 1, then over the panels 53 or 63 and 54 or 64 and the sole piece 22 or 23 and end at the rear against the inside of the corresponding reinforcement strip 94. Subsequent positioning of the component elements consists in disposing, in the lower half mold 101, the front foam core 7, the central Z shaped web 21 whose lower flange 27 is placed opposite sole piece 23, the rear foam core 8 and finally the trailing edge rider 9. Then the upper half mold 100 thus loaded is turned over on the lower half mold 101 also loaded, as shown in FIG. 3, and the the two half molds 100 and 101 are locked one on the other in the closed position of the mold, which is inserted in a heating oven so as to undergo a polymerization cycle at the suitable temperature.

Depending on the nature of the protective cover 20 for the leading edge, this element may be either bonded in position after molding of the blade, or also placed in the mold before molding, using a mold with mobile leading edge slide as has already been suggested in the above mentioned French patent No. 84 19 432.

What is claimed is:

1. A composite material blade, more particularly for the rotor of an aircraft with rotary wing, including:
    a forward torsion and flexion box extending substantially over the forward half of the blade and defined by
    a forward longeron disposed along the leading edge of the blade over the whole of its span and formed from at least one bundle of laminated threads of high mechanical strength fibers agglomerated by means of a synthetic polymerized resin,
    a central and transverse rib disposed substantially along the thickness of the blade so as to substantially connect its extrados with its intrados, in the mean part of the chord of the blade, and which extends over the whole span thereof,
    front extrados and intrados covering parts which connect the front longeron to the transverse rib so as to close the forward box, and
    a core filling the forward box, made from an alveolar material, and
    a rear filling element, also made from an alveolar material, adjacent the transverse rib and extending therefrom to the vicinity of the trailing edge of the blade and over the whole span thereof, with a wedge shape profiled to the shape of the rear half of the blade, which blade further comprises:
    a central longeron extending also over the whole span of the blade and having a section in the form of a Z whose end flanges forming respectively an extrados sole piece and an intrados sole piece each formed from at least one bundle laminated threads of high mechanical strength fibers agglomerated by means of a synthetic polymerized resin, integrated respectively in the extrados covering and in the intrados covering and whose web is formed by said central rib which has a laminated shell structure with a filling formed of honeycomb panel of constant thickness sandwiched between two lateral sheets to which the honeycomb is bonded and which are each formed from at least one layer of a fabric of fibers agglomerated by a synthetic polymerized resin extending beyond the upper and lower ends of its filling so as to form two flanges extending one on one side and the other on the other side of the mean plane of said honeycomb filling and firmly secured against said internal sheets of the extrados and intrados coverings at the level of said sole pieces of the central longeron.

2. The blade as claimed in claim 1, wherein said forward longeron, has a substantially C shaped section, the two free ends of which are in abutment against the forward edge of the honeycomb panels of the front portions of the extrados and intrados coverings, whereas the internal sheets of said front portions of these coverings are fixed by their front end portion against the internal faces of the ends of the front C shaped longeron, between said internal faces and the front filling core, which fills the recess of the front C shaped longeron, and the external sheets of said front portions of these coverings are fixed by their front end portion against the external faces of the C shaped front longeron which they cover at least partially.

3. The blade as claimed in claim 2, wherein the front C shaped longeron has, in its portion directly adjacent the leading edge, a longitudinal recess housing a counterweight for centering the cross section of the blade substantially in the front quarter of the chord, in the usual part of the blade, said counterweight being covered by the front portions of the external sheets of the front parts of the extrados and intrados coverings of the blade, which join up at the level of the leading edge.

4. The blade as claimed in claim 1, wherein the front longeron has, on the front of its external face a step in which is housed a cover protecting the leading edge, and the external sheets of the front parts of the extrados and intrados coverings are nipped by their front end portion in the step of the front longeron, between this latter and said cover.

5. The blade as claimed in claim 1, wherein the external sheet of each of the coverings extends continuously from the leading edge of the blade to its trailing edge while covering the external face of the corresponding sole piece of the central longeron, as well as the external face of a front honeycomb panel and of a rear honeycomb panel of the corresponding covering, which extend respectively from the front longeron to the sole piece, and from this latter as far as the vicinity of the trailing edge of the blade, and the internal sheet of each of the coverings extends also continuously from the front longeron to the trailing edge of the blade while covering the internal face of the corresponding sole piece of the central longeron, as well as the internal face of said front and rear honeycomb panels of the corresponding covering.

6. The blade as claimed in one of claim 1, wherein each of the external and internal sheets of the extrados and intrados coverings is formed by a stack of layers of fabric made of fibers of different kinds, the fabric layer or layers whose fibers are the most fragile to shocks being disposed inwardly of the corresponding covering.

7. The blade as claimed in claim 1, wherein two strips for reinforcing the trailing edge, extending substantially over the rear third of the blade and are made from material reinforced with high mechanical strength fibers in the form of sheets or in the form of a fabric are each disposed between rear facing portions of the external sheet of one of the coverings, on one side and on the other side opposite the external face of the rear honeycomb panel and the internal sheet of the corresponding covering, so that the external sheets and the reinforcement strips form, in their rear end portion, a trailing edge tongue, whereas the internal sheets of said coverings are fixed in their rear end portion against the inside of the reinforcement strips.

8. The blade as claimed in claim 1, wherein the front longeron and the sole pieces of the central longeron are formed of unidirectional laminated glass threads oriented in the direction of the span of the blade.

9. The blade as claimed in claim 1, wherein said rib forming the web of the central longeron is slanted slightly from the front to the rear and from the extrados to the intrados and said extrados and intrados sole pieces extend respectively forwardly and rearwardly of said web.

10. The blade as claimed in either one of claims 1 or 9 wherein, which blade further comprises a rear torsion and flexion box extending substantially over the rear half of the blade and defined between the central longeron and rear extrados and intrados covering portions which are fixed along the trailing edge of the blade so as to close the rear box about a filling core formed by the rear filling element.

11. The blade as claimed in claim 10, wherein:
front and rear portion soft the extrados and intrados coverings each have a laminated shell structure with a web formed of a honeycomb panel of constant thickness sandwiched between two working sheets to which the honeycomb panel is bonded and each formed of a stack of at least two layers of fabric made from high mechanical strength fibers agglomerated by means of a synthetic polymerized resin, one of the two sheets being an internal sheet adjacent the corresponding core and the other an external sheet forming the skin of the blade.

12. The blade as claimed in claim 10, wherein:
the two filling cores forming non working shaping mandrels are formed of prefabricated blocks of a very light alveolar material.

13. A method of manufacturing a blade such as claimed in one of the preceding claims, consisting in:
assembling the different component elements of the blade in two complementary and rigid upper and lower half molds of a single mold, such that the inner shape of each half mold is adapted to the form of the corresponding upper or lower half of the outer profile of the blade, taking into account its variations in shape, thickness, chord and twisting along its span, locking the upper half mold on the lower half mold, and placing the closed loaded mold in a heating oven and causing it to undergo a polymerization cycle during a single molding operation, in which method the order of positioning the elements is the same in the two half molds, only the counterweight, the front and rear cores, the central rib and the trailing edge rider being placed in the lower half mold, and consisting:

in successively positioning in each of the half molds,
the external sheet of the corresponding covering, disposing first of all in the bottom of the half mold the layer or layers of fabric made from fibers impregnated with polymerizable resin whose fibers are most fragile to shocks, when the external sheet includes fabrics made from fibers of different kinds, hanks of laminated threads impregnated with polymerizable resin, forming one of the two complementary halves of the front longeron and, in the lower half mold, the counterweight in front of said hanks in this half mold, hanks of laminated threads impregnated with polymerizable resin and forming the corresponding sole of the central longeron, a reinforcement strip of the trailing edge, on the rear third of the external sheet, the honeycomb front panel and rear panel of the corresponding covering, disposed on the external sheet, the first between the front half longeron and the corresponding sole piece and the second behind this latter, towards the trailing edge, after applying an adhesive film on each side of the two panels, and the internal sheet of the corresponding covering, disposing first of all in the corresponding half mold the layer or layers of fabrics made from fibers impregnated with polymerizable resin whose fibers are more fragile to shocks, when the internal sheet includes fabrics made from fibers of different kinds, then, positioning in the lower half mold,
the front core,
the central rib forming the web of the central longeron,
the rear core, and
the trailing edge rider, before turning over the loaded upper half mold on the loaded lower half mold and closing the mold so as to carry out polymerization.

* * * * *